(12) United States Patent
Suzuki et al.

(10) Patent No.: US 6,427,512 B2
(45) Date of Patent: Aug. 6, 2002

(54) METHOD OF AND APPARATUS FOR BLANKING ELEMENTS OF BELT FOR CONTINUOUSLY VARIABLE TRANSMISSION

(75) Inventors: Tetsuo Suzuki; Makoto Kobayashi; Takumitsu Tachibana, all of Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/788,449

(22) Filed: Feb. 21, 2001

(30) Foreign Application Priority Data

Feb. 21, 2000 (JP) .......................... 2000-043245
Feb. 21, 2000 (JP) .......................... 2000-043246

(51) Int. Cl.$^7$ ........................ B21D 28/04; B21D 28/10
(52) U.S. Cl. ..................... 72/337; 72/327; 72/339; 72/420; 83/40; 83/55; 83/861; 83/412
(58) Field of Search ..................... 72/337, 331, 330, 72/339, 420, 327; 83/40, 55, 412, 753, 861, 865, 454

(56) References Cited

U.S. PATENT DOCUMENTS

| 1,474,719 | A | * | 11/1923 | Josephson |
| 2,302,646 | A | * | 11/1942 | Temple |
| 2,600,834 | A | * | 6/1952 | Blair |
| 2,746,125 | A | * | 5/1956 | Cuny |
| 3,668,959 | A | * | 6/1972 | Richter |
| 3,735,653 | A | * | 5/1973 | Powell |
| 4,033,168 | A | * | 7/1977 | Fisk |
| 4,320,647 | A | | 3/1982 | Kummeling et al. |
| 4,981,058 | A | * | 1/1991 | Gavrun |

FOREIGN PATENT DOCUMENTS

EP          0278545 A      8/1988

\* cited by examiner

*Primary Examiner*—Daniel C. Crane
(74) *Attorney, Agent, or Firm*—Birch, Stewart, Kolasch & Birch, LLP

(57) ABSTRACT

A metal sheet having a pair of thin portions on respective marginal edges thereof which are joined to a remaining portion of the metal sheet via respective corners is centered by positioning the center between the corners as the center of the metal sheet. Then, elements are blanked out of the metal sheet. The elements remain joined to the metal sheet by respective connectors which are formed in the respective thin portions of the metal sheet, the bodies having respective lower edges formed in the respective thin portions of the metal sheet. The elements are separated from the metal sheet by cutting off the connectors along the lower edges of the bodies.

10 Claims, 10 Drawing Sheets

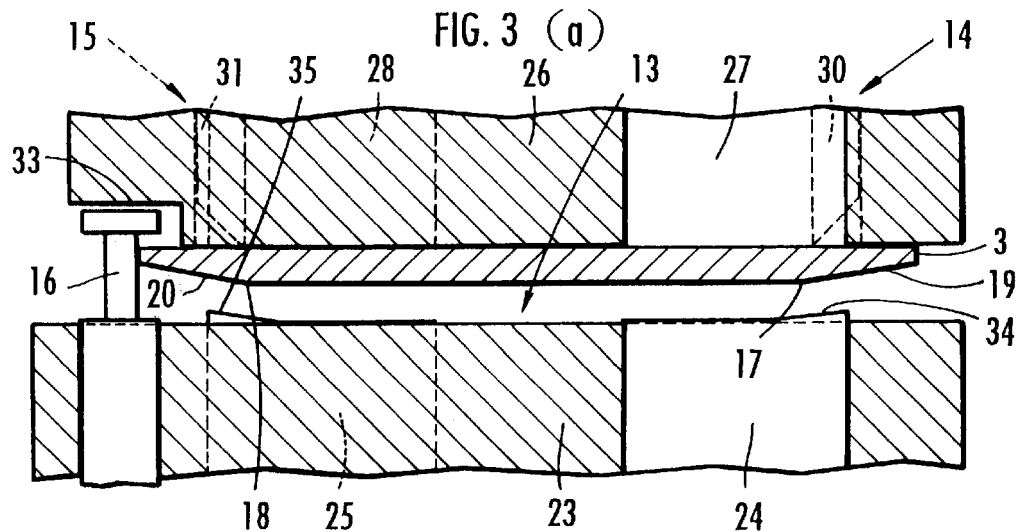
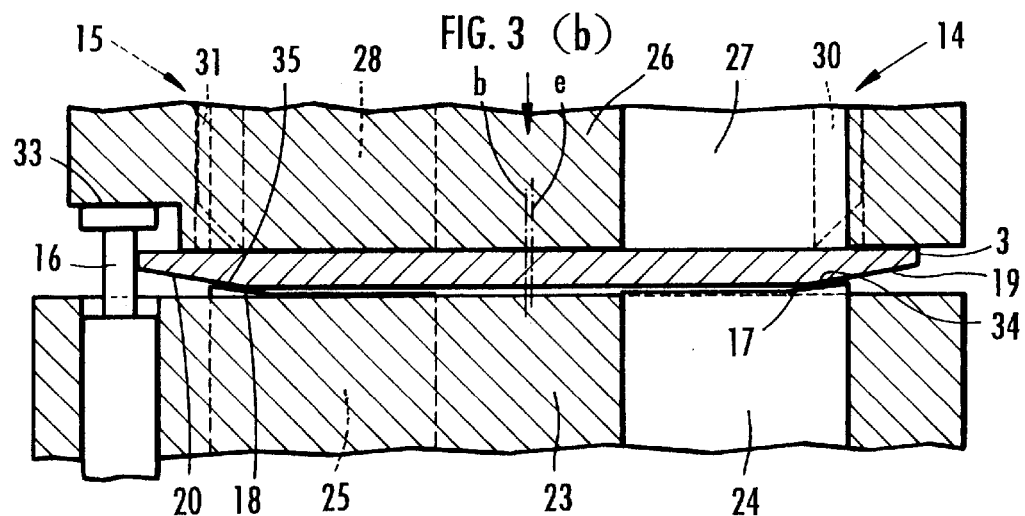
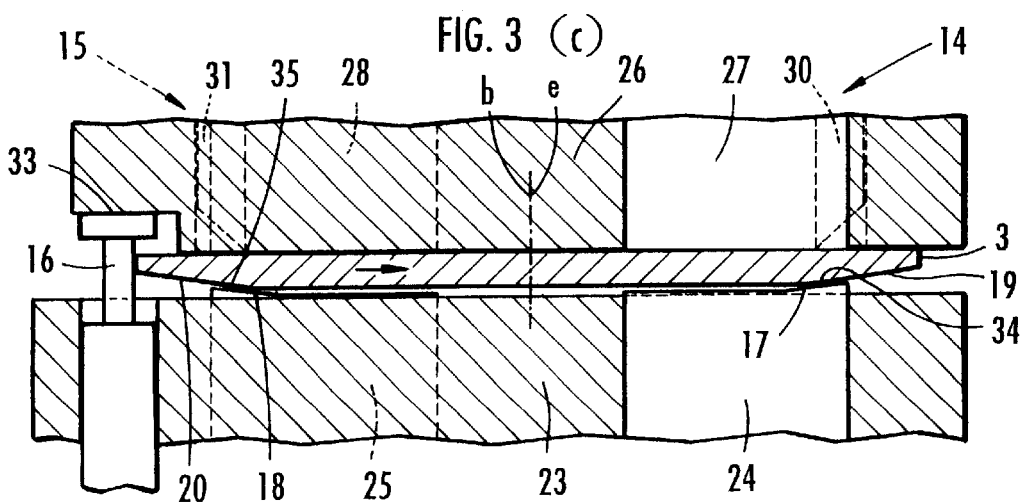

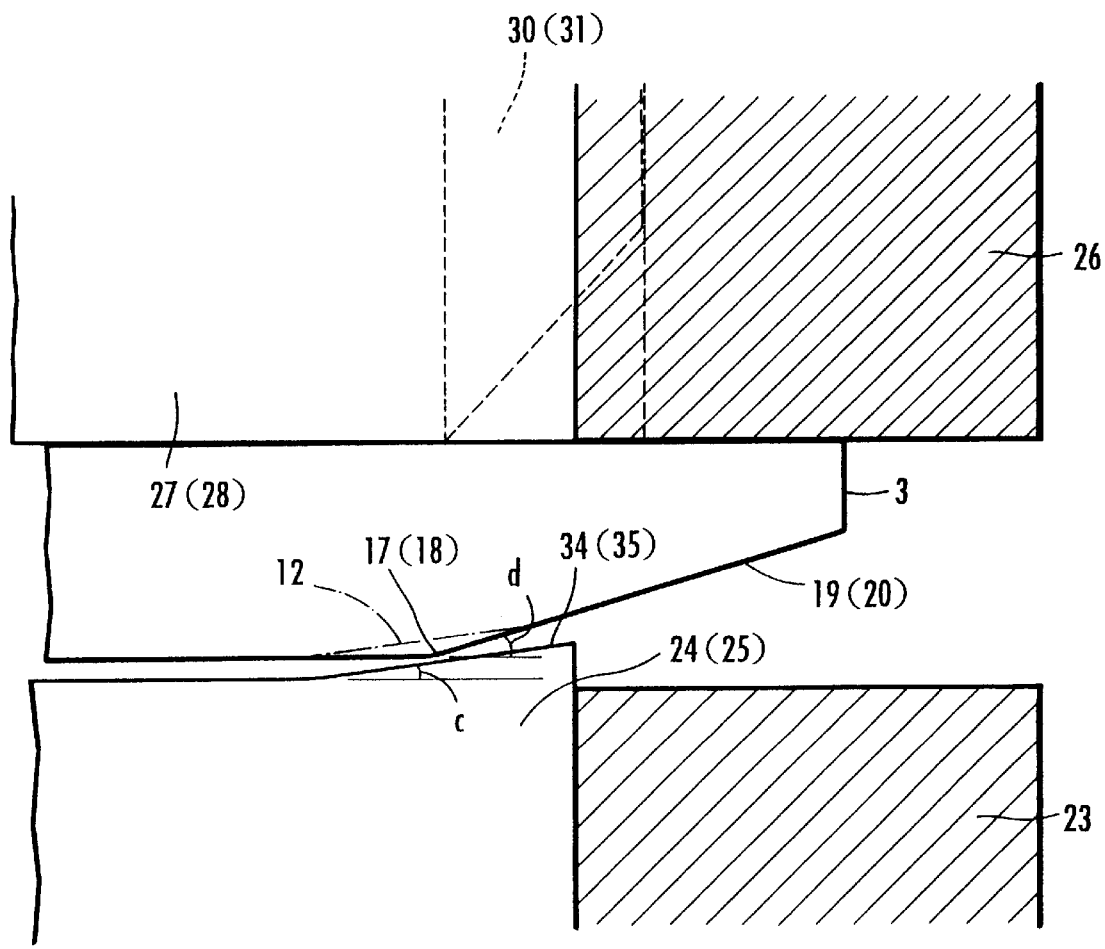

METHOD OF AND APPARATUS FOR BLANKING ELEMENTS OF BELT FOR CONTINUOUSLY VARIABLE TRANSMISSION

BACKGROUND OF THE INVENTION

1. Field of the Invention

The present invention relates to a method of and an apparatus for blanking elements of a belt for use in a continuously variable transmission.

2. Description of the Prior Art

Generally, each of elements of a belt for use in a continuously variable transmission (CVT) comprises a body having a V-shaped surface for contact with a pulley of the continuously variable transmission and a head joined to an upper edge of the body. The element also has a pair of recesses defined between the body and the head. A plurality of elements are stacked and bundled into an annular form as the belt by endless rings that are mounted respectively in the recesses. When the belt is completed, the bodies with the V-shaped surfaces are positioned radially inside of the annular form and the heads are positioned radially outside of the annular form.

The elements are blanked out of a metal sheet by a die and a punch. A process of blanking an element out of a metal sheet comprises the steps of blanking an element out of the metal sheet while keeping the element joined to the metal sheet by a connector and separating the element from the metal sheet by cutting off the connector. According to the blanking process, the connector is positioned at two locations, i.e., a central region or tip end of the head and a central region or lower edge of the body, which are not required to be highly accurate dimensionally in the shearing process that is performed in the blanking step. In the blanking step, the V-shaped surface that needs to be of the highest dimensional accuracy of the element is reliably sheared to a desired level of dimensional accuracy.

When the connector is cut off in the separating step, however, a so-called shear drop, which is a thin region whose surface is inclined to the blanking direction, is created in the central region of the head and the central region of the body. If such a shear drop is positioned on the tip end of each of the heads that are located radially outside of the annular form of the belt, then the annular stack of the elements tends to bend toward the heads out of the circumferential direction due to the contact between the shear drops, thus adversely affecting the accuracy with which the elements are stacked.

The body of each of the elements has, on one side thereof, a thin portion for smoothly guiding the stacked elements to bend in the circumferential direction. The thin portion has already been prepared by a pair of corners on the opposite edges of the metal sheet, and serves as a blanking position corresponding to a substantially lower half portion of the body. Since such thin portions are positioned on the respective opposite edges of the metal sheet, a pair of symmetrical elements is blanked out of the metal sheet at the respective positions corresponding to the thin portions. Specifically, a pair of punches is used to blank the respective elements out of the metal sheet such that the thin portions are located at respective predetermined positioned on the elements. In order to keep the blanking positions highly accurately in alignment with the respective thin portions of the metal sheet prior to the blanking step, it is necessary to center the metal sheet to align the center between the blanking positions, i.e., between the punches, with the transverse center of the metal sheet.

Heretofore, it has been customary to center the metal sheet with a pair of guide members such as guide plates or abutment pins on both sides of a feed path for delivering the metal sheet for contacting and positionally limiting the opposite edges of the metal sheet. The guide members are spaced from each other by a distance substantially equal to the width of the metal sheet.

However, if the clearance between the guide members and the opposite edges of the metal sheet is reduced to center the metal sheet highly accurately with the guide members, then the metal sheet as it is delivered is subject to increased resistance due to contact between the metal sheet and the guide members, resulting in a failure to deliver the metal sheet at a high speed.

With the metal sheet having the thin portions on the opposite edges thereof, the width of one of the thin portions may possibly be different from the width of the other thin portion. If the widths of the thin portions are different from each other, then even when the transverse center of the metal sheet is aligned with the center between the punches by the guide members, the thin portions are not located in the desired positions on the bodies, and hence the thin portions of the blanked elements may be positioned differently from each other.

SUMMARY OF THE INVENTION

It is therefore an object of the present invention to provide a method of and an apparatus for highly accurately blanking elements of a belt for use in a continuously variable transmission.

To achieve the above object, there is provided in accordance with the present invention a method of blanking elements of a belt for use in a continuously variable transmission, each having a body having opposite side edges which jointly provide a V-shaped surface for contact with a pulley of the continuously variable transmission and a head joined to a first edge of the body, symmetrically out of a metal sheet having a pair of thin portions on respective marginal edges thereof which are joined to a remaining portion of the metal sheet via respective corners, the method comprising the steps of centering the metal sheet by positioning a center between the corners as a center of the metal sheet, blanking the elements out of the metal sheet, the elements remaining joined to the metal sheet by respective connectors which are formed in the respective thin portions of the metal sheet, the bodies having respective second edges remote from the first edge and formed in the respective thin portions of the metal sheet, and separating the elements from the metal sheet by cutting off the connectors along the second edges of the bodies.

In the above method, first, the metal sheet is centered. Since the metal sheet is centered by positioning the center between the corners as the center of the metal sheet, the metal sheet can be centered accurately without being affected by the widths of the thin portions, i.e., the distances from the corners to the opposite edges of the metal sheet.

Then, the elements are blanked out of the metal sheet while they remain joined to the metal sheet by the connectors. The connectors are disposed at the second edges, i.e., lower edges, of the bodies. The V-shaped surface provided by the opposite side edges of each of the bodies is thus reliably sheared off with a sufficient level of accuracy.

Thereafter, the elements are separated from the metal sheet by cutting off the connectors. Since the connectors are disposed between the opposite side edges of the bodies which provide the V-shaped surface, only the connectors are required to be severed between the opposite side edges of the bodies. Because the peripheral edges of the elements have already been sheared highly accurately by this time, no shear drop occurs on the heads as the connectors to be sheared off are not joined to the heads, so that the heads are kept flat as desired. When the elements are stacked, the heads are held in reliable contact with each other, and the stack of the elements does not tend to bend toward the heads out of the circumferential direction, thus increasing the accuracy with which the elements are stacked. Even if a shear drop occurs when the connectors joined to the bodies are cut off, since the bodies are positioned radially inside of the annular form when the elements are stacked into the annular form, the shear drop does not adversely affect the accuracy with which the elements are stacked, and hence the elements can be stacked well in the circumferential direction.

The step of blanking the elements comprises the step of blanking the elements out of the metal sheet so as to be displaced in a blanking direction by a distance equal to at least the thickness of the metal sheet between the corners, the connectors being inclined and joined to the blanked elements which lie substantially parallel to the metal sheet.

Inasmuch as the elements are blanked out of the metal sheet so as to be displaced in a blanking direction by a distance equal to at least the thickness of the metal sheet between the corners, the elements are prevented from being fitted again in holes, complementary in shape to the elements, defined in the metal sheet after the elements are blanked.

The step of blanking the elements comprises the step of forming the connectors each having a width which is 1 to 3 times the thickness of the metal sheet between the corners.

The elements blanked out of the metal sheet remain joined to the metal sheet by the connectors formed in the thin portions which are thinner than the metal sheet between the corners. If the width of the connectors were smaller than the thickness of portion of the metal sheet between the corners, then the connectors would be bent or crack due to the weight of the elements, and the elements might possibly come off the metal sheet when the metal sheet is delivered to the separating step. In this case, the elements could not be separated from the metal sheet highly accurately by cutting off the connectors. If the width of the connectors were greater than a width that is 3 times the thickness of portion of the metal sheet between the corners, then the connectors would pose increased resistance to the cutting off of the connectors, preventing the elements from being smoothly separated from the metal sheet or possibly deforming the elements due to forces applied when severing the connectors.

According to the present invention, as described above, the width of the connectors is 1 to 3 times the thickness of the metal sheet between the corners, thus making the connectors strong enough to hold the elements and easy to be cut off. Therefore, the elements remain firmly joined to the metal sheet by the connectors, but can be separated as highly accurate elements by smoothly cutting off the connectors.

The step of blanking the elements comprises the steps of placing the metal sheet on a die, and moving a pair of blanking punches toward the die to blank the elements out of the metal sheet, and the step of centering the metal sheet comprises the steps of pressing the metal sheet horizontally against a pair of counter punches mounted in the die for movement into and out of the die in alignment with the blanking punches, respectively, before the elements are blanked out of the metal sheet, the counter punches having respective slanted guide surfaces disposed so as to be aligned with the respective corners of the metal sheet and inclined downwardly toward the center of the metal sheet, and guiding the corners of the metal sheet along the slanted guide surfaces, respectively, to center the metal sheet.

The counter punches have the respective slanted guide surfaces for centering the metal sheet before the elements are blanked out of the metal sheet. Therefore, the metal sheet can be centered simply by pressing the metal sheet horizontally against the counter punches. Specifically, when the metal sheet is lowered toward the die, the corners of the metal sheet abut against the slanted guide surfaces of the counter punches. At this time, if the center between the corners of the metal sheet has been displaced to the left or right from a centered position, then one of the corners abuts against the slanted guide surface confronting the corner. Upon continued downward movement of the metal sheet in its horizontal attitude, the corner slides downwardly along the slanted guide surface, and the metal sheet moves in its horizontal attitude toward the centered position. The other corner abuts against the slanted guide surface confronting the other corner, so that the corners are positioned between the slanted guide surfaces. Inasmuch as the metal sheet is kept in its horizontal attitude and the corners are held against the respective slanted guide surfaces at the same positions, the center between the corners of the metal sheet is positioned as the centered position, thus centering the metal sheet. The metal sheet thus centered is then blanked by the blanking punches while its attitude is being maintained. Accordingly, the elements can be blanked highly accurately out of the metal sheet.

The metal sheet on the counter punches is centered before the metal sheet is blanked by the blanking punches. It is not necessary to center the metal sheet highly accurately with guide members which limit the opposite edges of the metal sheet to guide the metal sheet when the metal sheet is fed and charged into a position between the blanking punches and the counter punches. Since the clearance between the guide members and the metal sheet can be relatively large, any contact between the guide members and the metal sheet is reduced to allow the metal sheet to be delivered at a high speed for manufacturing the elements highly efficiently.

An apparatus for blanking elements out of a metal sheet according to the present invention is of a structure for carrying out the above blanking method. Specifically, the apparatus comprises a die for placing the metal sheet thereon, a pad for pressing the metal sheet against the die, a pair of counter punches mounted in the die for movement into and out of the die for abutting against a lower surface of the metal sheet at respective blanking positions thereon which are laterally spaced from each other, and a pair of blanking punches for lowering the metal sheet at the respective blanking positions thereon against the counter punches to blank the elements out of the metal sheet, the blanking punches having respective connector forming punches for forming the connectors in the respective thin portions of the metal sheet, the bodies having respective second edges remote from the first edge and formed in the respective thin portions of the metal sheet, the die having cavities defined therein at respective positions aligned with the connector forming punches, respectively, for accommodating the connectors respectively therein.

With the above arrangement, the elements are blanked out of the metal sheet pressed against the die by the pad by the blanking punches and the counter punches which cooperate with each other. At this time, the connector forming punches produce the connectors, allowing the elements to be blanked while remaining joined to the metal sheet by the connectors. The connectors are formed on the second edges, i.e., lower edges, of the bodies positioned in the thin portions of the metal sheet, by the connector forming punches. The connectors can thus be formed without causing a reduction in the accuracy of the V-shaped surfaces which need to be sheared highly accurately by the blanking punches.

The blanking punches are shaped to cooperate with the counter punches for blanking the elements out of the metal sheet substantially parallel thereto so as to be displaced in a blanking direction by a distance equal to at least the thickness of the metal sheet between the corners, the connector forming punches and the cavities being shaped to incline the connectors to the blanked elements and joined in opposite directions to the elements.

The elements are blanked, by the coaction of the blanking punches and the counter punches, out of the metal sheet substantially parallel thereto so as to be displaced in the blanking direction by the distance equal to at least the thickness of the metal sheet between the corners. Therefore, the elements are prevented from being fitted again in holes, complementary in shape to the elements, defined in the metal sheet after the elements are blanked. The connectors formed by the connector forming punches are inclined to the blanking direction along the inclination of the connector forming punched and the inclination of the cavities in the die. Consequently, the blanked elements have a thickness equal to the thickness of the portion of the metal sheet between the corners, and are highly rigid.

The connector forming punches are shaped to form the connectors each having a width which is 1 to 3 times the thickness of the metal sheet between the corners. When the connectors are formed by the connector forming punches, therefore, the width of the connectors can easily be made 1 to 3 times the thickness of the metal sheet between the corners.

The counter punches have respective slanted guide surfaces disposed so as to be aligned with the respective corners of the metal sheet and inclined downwardly toward the center of the metal sheet, for guiding the corners of the metal sheet along the slanted guide surfaces, respectively, to center the metal sheet when the metal sheet is pressed horizontally against the die by the pad before the elements are blanked out of the metal sheet by the blanking punches.

The metal sheet is lowered in its horizontal attitude toward the die by the pad, and the corners thereof are guided along the slanted guide surfaces of the counter punches. Thus, the metal sheet can reliably be centered with a highly simple arrangement.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3(a) is a fragmentary cross-sectional view illustrative of a stage of a centering step carried out by the blanking apparatus;

FIG. 3(b) is a fragmentary cross-sectional view illustrative of a stage of the centering step which follows the stage shown in FIG. 3(a);

FIG. 3(c) is a fragmentary cross-sectional view illustrative of a stage of the centering step which follows the stage shown in FIG. 3(b);

FIG. 4 is an enlarged fragmentary elevational view of a portion of the blanking apparatus;

DETAILED DESCRIPTION OF THE PREFERRED EMBODIMENT

Figure 1:
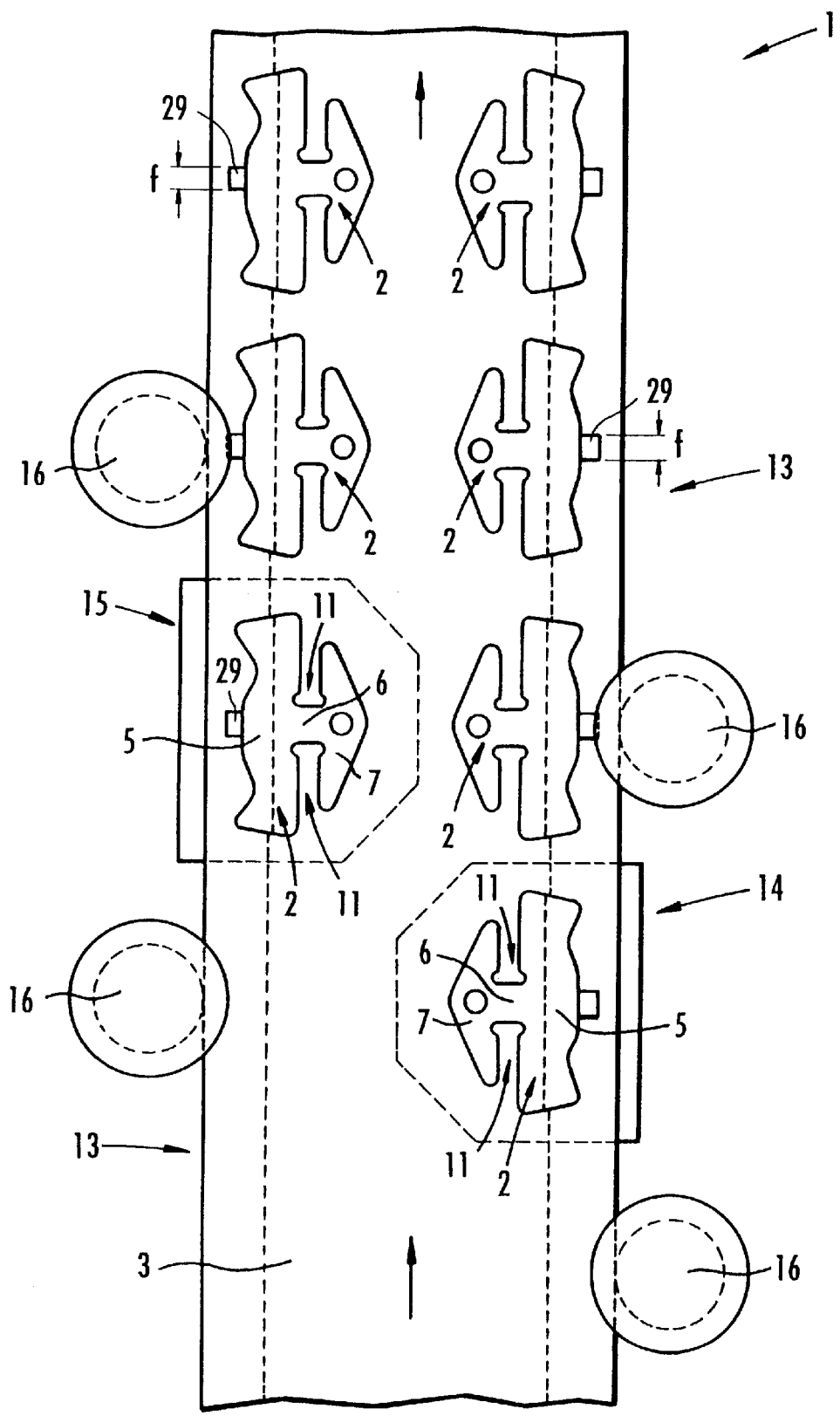
FIG. 1 is a plan view of a blanking apparatus according to an embodiment of the present invention.

As shown in FIG. 1, a blanking apparatus 1 according to an embodiment of the present invention blanks elements 2 out of a web-shaped metal sheet 3.

Figure 9:
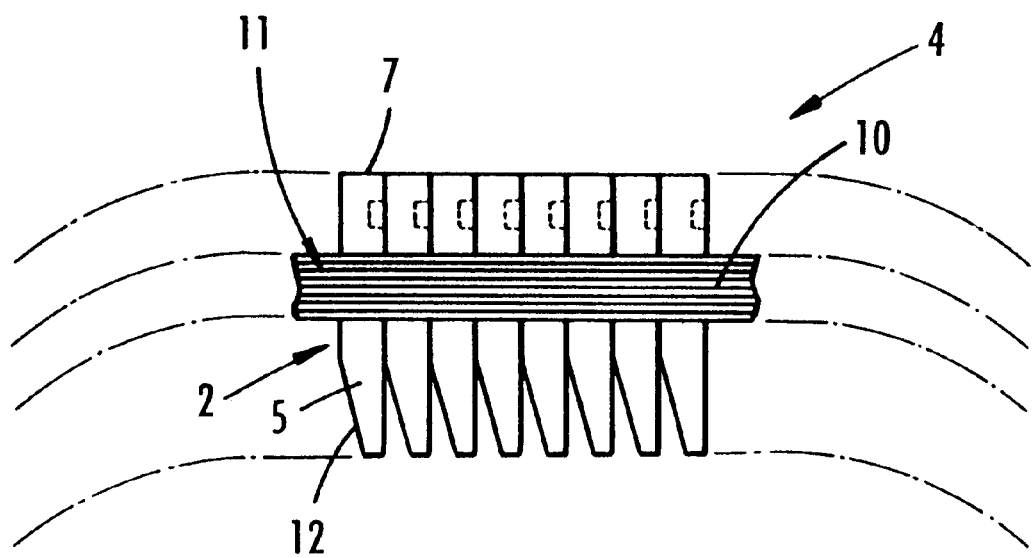
FIG. 9 is a view of a portion of a belt for use in a continuously variable transmission.

As shown in FIG. 9, a plurality of elements 2 are stacked into an annular form as a belt 4 for use in a continuously variable transmission.

Figure 10:
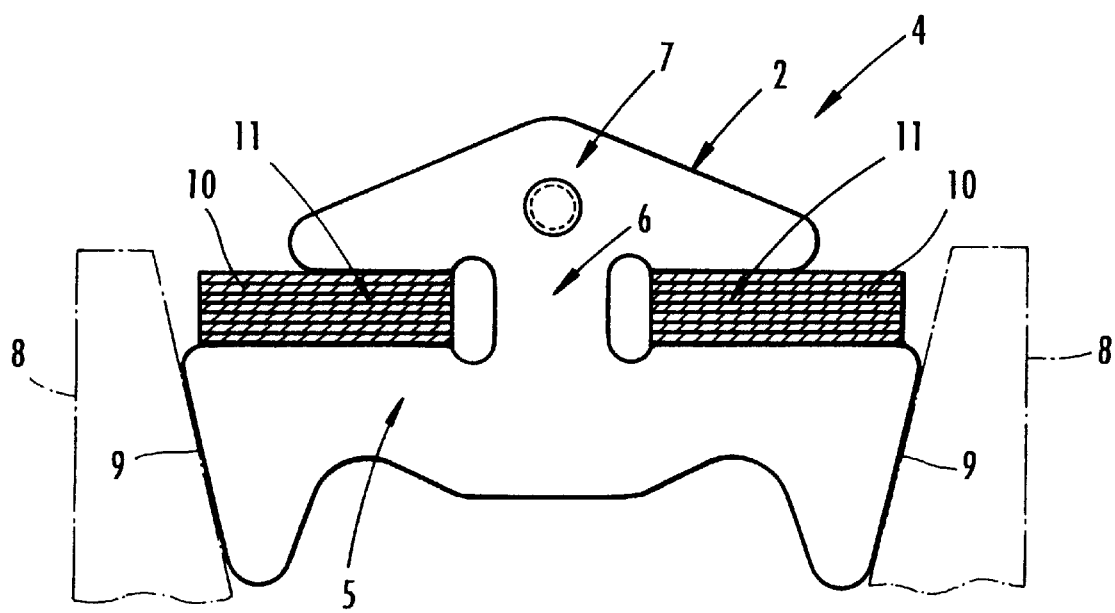
FIG. 10 is a view showing a shape of an element.

As shown in FIG. 10, each of the elements 2 comprises a body 5 and a head 7 joined to an upper edge of the body 5 by a neck 6. The body 5 has opposite side edges jointly providing a V-shaped surface 9 for contacting a pulley 8 of a continuously variable transmission indicated by the imaginary lines in FIG. 10. When the belt 4 is completed, the heads 7 are positioned radially outside of the annular form and the bodies 5 are positioned radially inside of the annular form. Between the head 7 and the body 5 that are positioned on the opposite sides of the neck 6, there are defined two recesses 11 in which endless rings 10 are mounted. As shown in FIG. 9, the elements 2 are bundled into the annular form by the endless rings 10 disposed in the respective recesses 11. Each of the endless rings 10 comprises a stack of metal sheet rings. The body 5 of each of the elements 2 has a slanted surface 12 on a substantially lower half portion of one side thereof for allowing the stacked elements 2 to be bent smoothly in the circumferential direction of the belt 4.

The blanking apparatus 1 will be described in detail below. As shown in FIG. 1, the blanking apparatus 1 has a feed path 13 for delivering the web-shaped metal sheet 3, and a first processing station 14 and a second processing station 15 that are spaced along the feed path 13.

In the first processing station 14 and the second processing station 15, two elements 2 are simultaneously blanked out of the metal sheet 3. The blanking apparatus 1 also has a plurality of guide members 16 disposed on opposite sides of the feed path 13 for guiding the metal sheet 3 to move along the feed path 13.

Figure 2:
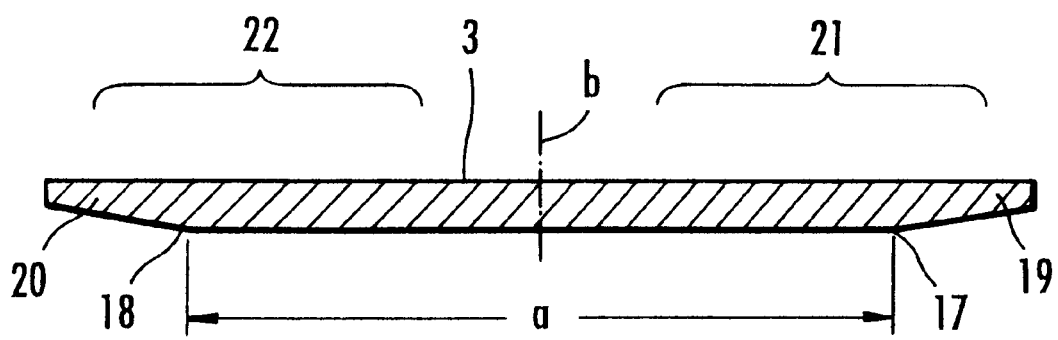
FIG. 2 is a transverse cross-sectional view of a metal sheet.

Prior to describing the first processing station 14 and the second processing station 15, the shape of the metal sheet 3 will first be described below. As shown in FIG. 1, two elements 2 are blanked out of the metal sheet 3 respectively in the first processing station 14 and the second processing station 15. As shown in FIG. 2, the metal sheet 3 has two thin portions 19, 20 on respective marginal edges thereof that are spaced from each other in the transverse direction of the sheet metal 3. The thin portions 19, 20 are joined to the rest of metal sheet 3 via respective corners 17, 18. The thin portions 19, 20 are tapered toward the respective opposite edges of the metal sheet 3. Opposite side portions of the metal sheet 3 which include part of the thin portions 19, 20 serve as element forming regions 21, 22 from which elements 2 are blanked. When pressed at the time the elements 2 are blanked, the thin portions 19, 20 provide slanted surfaces 12. Since the metal sheet 3 already has the thin portions 19, 20 before the elements 2 are blanked, the amount by which the thin portions 19, 20 are pressed to produce the slanted surfaces 12 may be small, and hence the elements 2 can be formed with increased accuracy.

The first processing station 14 and the second processing station 15 have identical structural details. As shown in FIG. 3(a), the first processing station 14 and the second processing station 15 have a die 23 and a pair of counter punches 24, 25 movable into and out of the die 23. The counter punches 24, 25 are normally biased to move upwardly out of the die 23 by biasing means, not shown. The first processing station 14 and the second processing station 15 also have a pad 26 disposed above the feed path 13 and movable downwardly toward the die 23 for pressing the metal sheet 3 against the die 23, and a pair of element blanking punches 27, 28 vertically aligned with the respective counter punches 24, 25 for blanking elements 2 out of the metal sheet 3. The element blanking punches 27, 28 of the first processing station 14 and the second processing station 15 are vertically movable in unison with each other by one lifting and lowering means, not shown. The pad 26 is vertically movable in ganged relation to the element blanking punches 27, 28.

Figure 5:
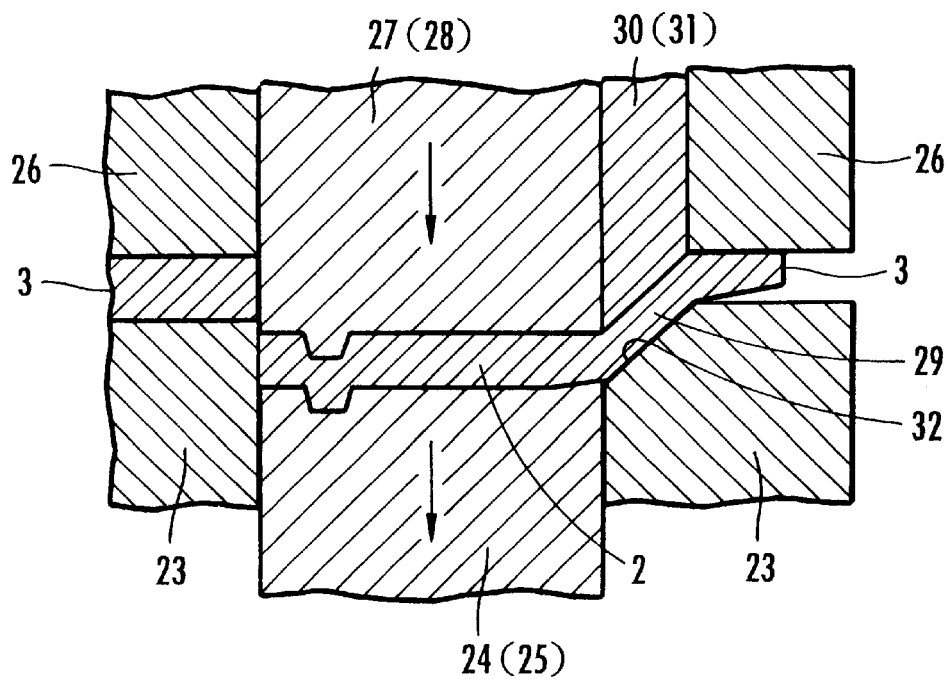
FIG. 5(a) is a fragmentary cross-sectional view illustrative of a stage of a blanking step carried out by the blanking apparatus.
FIG. 5(b) is a fragmentary cross-sectional view illustrative of a stage of the blanking step which follows the stage shown in FIG. 5(a)
Figure 5:
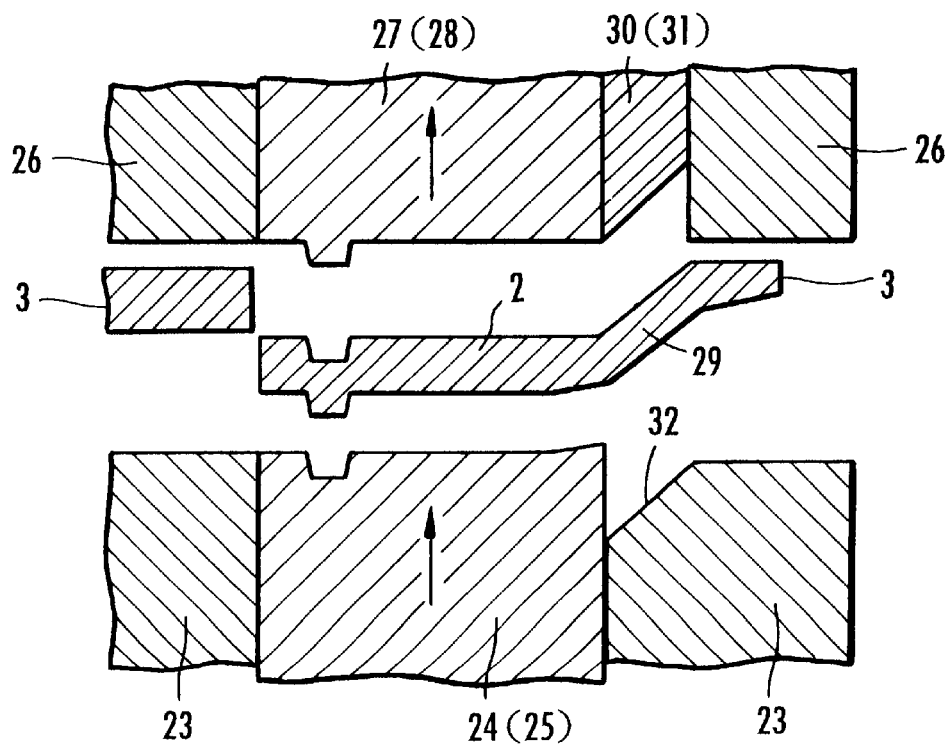

As shown in FIG. 5(a), connector forming punches 30, 31 for producing connectors 29 are disposed on respective sides of the element blanking punches 27, 28. The die 23 has a pair of recesses 32 (one shown) defined therein in vertical alignment with the respective connector forming punches 30, 31.

As shown in FIG. 3(a), each of the guide members 16 is biased to move upwardly by a biasing means, not shown, and can be lowered upon descent of the pad 26 by a guide member presser 33 on the pad 26. The guide members 16 can guide the metal sheet 3 even if the clearance between the guide members 16 and the metal sheet 3 is relatively large, so that the metal sheet 3 can be delivered at a high speed along the feed path 13 in reduced contact with the guide members 16.

In the blanking apparatus 1, in order to blank a pair of elements 2 simultaneously out of the metal sheet 3 while keeping the thin portions 19, 20 in alignment with the positions where the slanted surfaces 12 of the bodies 5 are produced, it is necessary to center the metal sheet 3 highly accurately. To meet such a requirement, the center of a region a between the corners 17, 18 is used as a centering reference b, as shown in FIG. 2.

As shown in FIG. 3(a), the counter punches 24, 25 have respective slanted guide surfaces 34, 35 for centering the metal sheet 3 before the counter punches 24, 25 blank elements 2 out of the metal sheet 3. The slanted guide surfaces 34, 35 are symmetrically positioned on the respective counter punches 24, 25. As shown in FIG. 4, the slanted guide surfaces 34, 35 also serve to press the respective thin portions 19, 20 to the profile of the slanted surfaces 12 of the bodies 5 as indicated by the imaginary line. In FIG. 4, only the first processing station 14 is shown at an enlarged scale. The second processing station 15 has structural details that are symmetrically identical to those of the first processing station 14, and the corresponding parts of the second processing station 15 are denoted by reference numerals in parentheses in FIG. 4. The slanted guide surface 34 (35) has an angle c of inclination which is smaller than an angle d of inclination of the corner 17 (18) of the metal sheet 3. Therefore, when the metal sheet 3 is lowered toward the die 23 by the pad 26, the corner 17 (18) of the metal sheet 3 is first brought into contact with the slanted guide surface 34 (35).

A blanking process carried out by the blanking apparatus 1 will be described below. In the present embodiment, after the metal sheet 3 is centered, elements 2 are blanked out of the metal sheet 3, the elements 2 remaining joined to the metal sheet 3 by connectors 29 at lower edges of the bodies 5. Thereafter, the elements 2 are separated from the metal sheet 3 by a cutting apparatus 36 shown in FIG. 7 which cuts off the elements 2 along the boundary between the connectors 29 and the elements 2.

First, the centering of the metal sheet 3 will be described below. As shown in FIG. 3(a), the metal sheet 3 delivered along the feed path 13 is lowered toward the die 23 by the pad 26. Before the metal sheet 3 is held on the die 23, the corners 17, 28 are brought into abutment against the slanted guide surfaces 34, 35 of the counter punches 24, 25. For example, as shown in FIG. 3(b), if the center b of the metal sheet 3 is out of alignment with a predetermined center e, then the corner 18 abuts against the slanted guide surface 35 which confronts the corner 18. Since the metal sheet 3 is further lowered while lying horizontally by the pad 26, the corner 18 slides along the slanted guide surface 35, so that the metal sheet 3 moves horizontally. When the other corner 17 abuts against the slanted guide surface 34 which confronts the corner 17, as shown in FIG. 3(c), the sliding movement of the corner 18 is limited, and the corners 17, 18 are positioned between the slanted guide surfaces 34, 35. The center b of the metal sheet 3 is thus brought into alignment with the predetermined center e, thereby centering the metal sheet 3 on the counter punches 24, 25. The metal sheet 3 thus centered is pressed securely against the die 23 by continued downward movement of the pad 26 while keeping its attitude.

The blanking of elements 2 will be described below with reference to FIGS. 5(a) and 5(b). In FIGS. 5(a) and 5(b), only the first processing station 14 is shown at an enlarged scale. Since the second processing station 15 has structural details that are symmetrically identical to those of the first processing station 14, the second processing station 15 is omitted from illustration. As shown in FIG. 5(a), while the metal sheet 3 is being held by the counter punch 24 from below the metal sheet 3, the element 2 is blanked out of the metal sheet 3 by the element blanking punch 27 as it is lowered. At the same time, the connector 29 is formed by the connector forming punch 30 lowered with the element blanking punch 27 and the recess 32 in the die 23 which corresponds to the connector forming punch 30.

Figure 6:
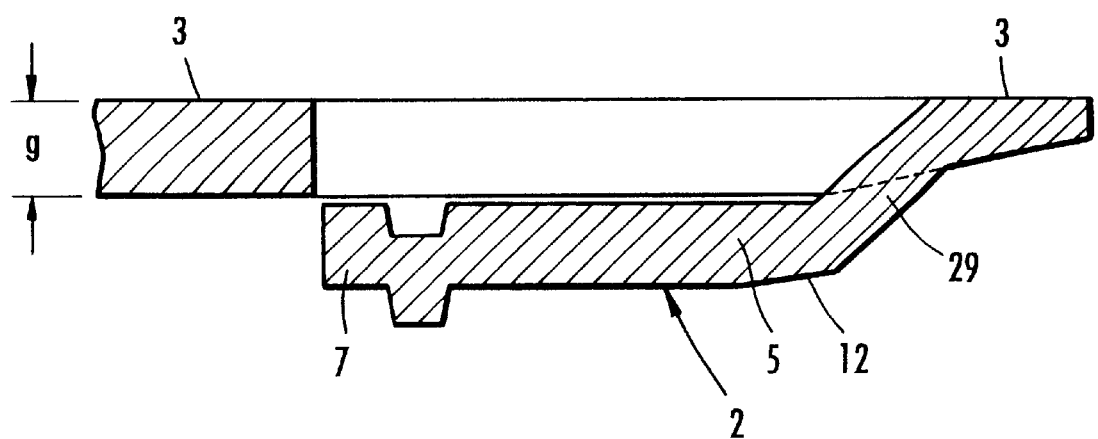
FIG. 6 is a transverse cross-sectional view of the metal sheet out which an element has been blanked.

At this time, as shown in FIG. 1, the connector 29 which is not sheared off is formed at a substantially central position on the body 5 of the element 2, and the peripheral edges of the element 2 other than the connector 29 are sheared off with high accuracy. As shown in FIG. 6, the element 2 remains joined to the metal sheet 3 while being kept in a horizontal attitude, but being displaced downwardly by a distance that is equal to at least the thickness of the metal sheet 3 at the head 7. As shown in FIG. 5(a), the connector 29 is formed to a slanted shape inclined toward the element 2 by the connector forming punch 30 and the recess 32, with the thickness of the metal sheet 3 in the connector 29 remaining substantially unchanged. As shown in FIG. 1, the connector 29 has a width f which is 1 to 3 times the thickness g of the metal sheet 3.

Figure 7:
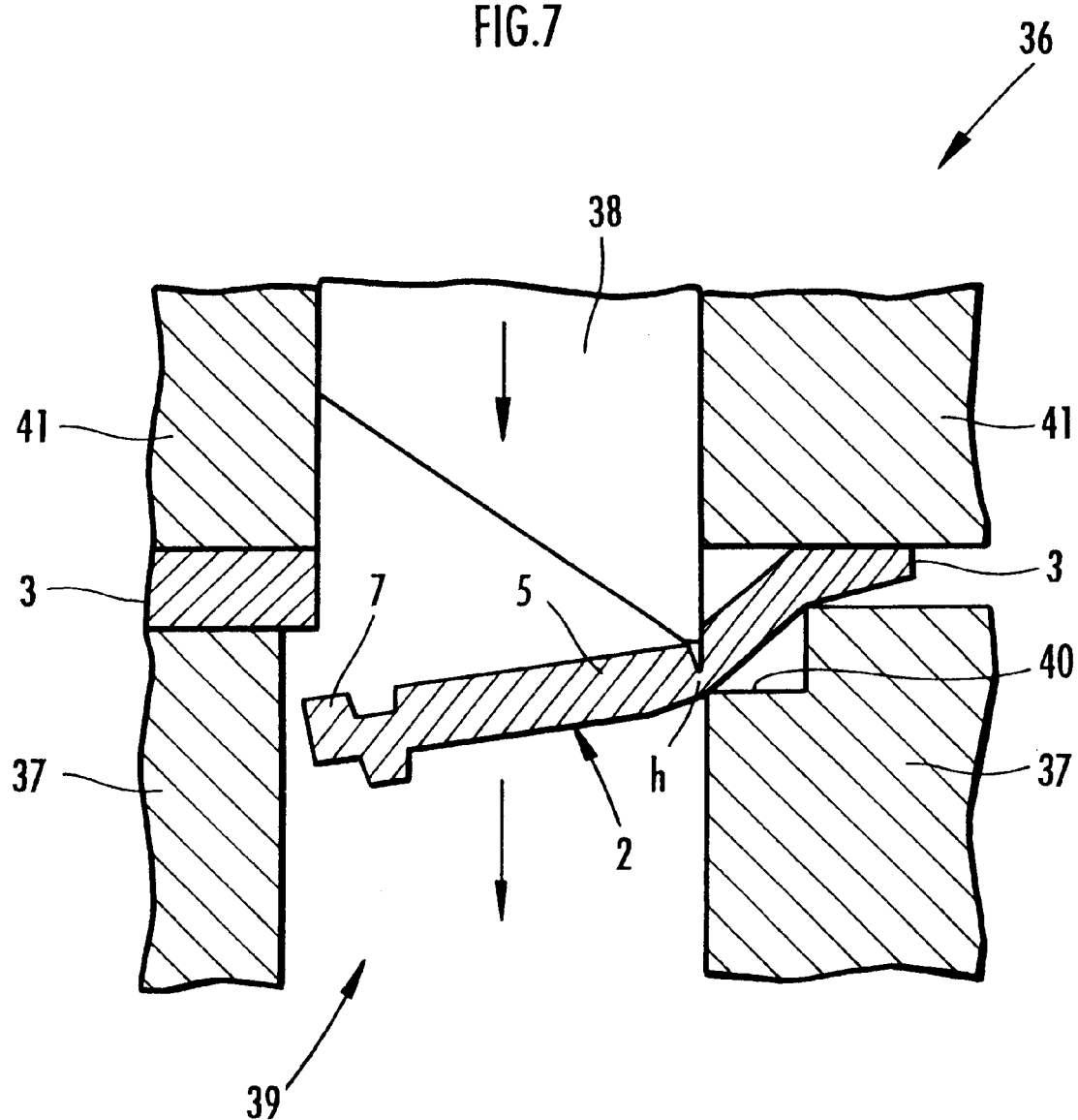
FIG. 7 is a fragmentary cross-sectional view illustrative of a separating step carried out by the blanking apparatus.

Then, as shown in FIG. 5(b), the element blanking punch 27, the connector forming punch 30, the counter punch 24, and the pad 26 are lifted, and the metal sheet 3 with the element 2 joined thereto by the connector 29 is removed and supplied to the cutting apparatus 36 shown in FIG. 7. In FIG. 7, the separation of only one of the two elements 2 produced on the left and right sides of the metal sheet 3 is shown. The separation of the other element 2 is carried out in an identical fashion, and hence is omitted from illustration.

As shown in FIG. 7, the cutting apparatus 36 has a separating die 37 for placing the metal sheet 3 thereon, and a separating punch 38 for cutting off the connector 29 from the metal sheet 3 on the separating die 37. The cutting apparatus 36 also has a discharge path 39 defined below the separating punch 38 for discharging the element 2 severed from the metal sheet 3, a clearance cavity 40 defined in the separating die 23 for accommodating the connector 29 therein, and a pad 41 disposed above the separating die 23 for pressing the metal sheet 3 against the separating die 23.

To separate the element 2 from the metal sheet 3 with the cutting apparatus 36, the metal sheet 3 supplied to and placed on the separating die 37 is pressed securely against the separating die 37 by the pad 41. Then, the separating punch 38 is lowered to cut off the element 2 along a boundary h between the connector 29 and the element 2. Therefore, the element 2 is separated from the metal sheet 3, and drops down the discharge path 39.

Figure 8:
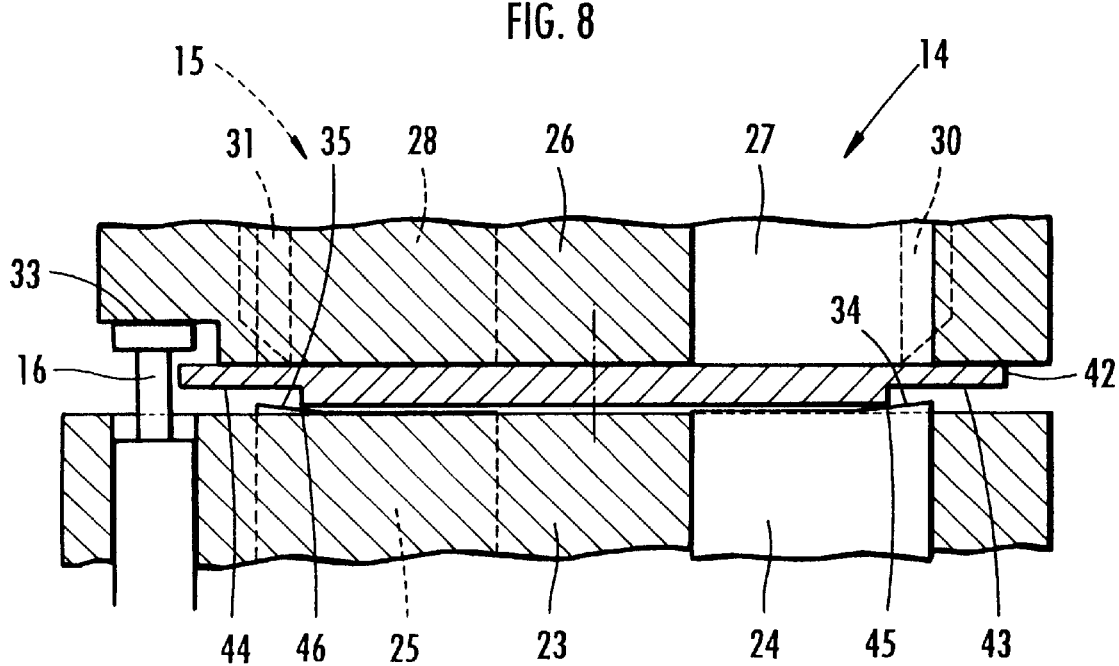
FIG. 8 is a fragmentary cross-sectional view illustrative of the manner in which the blanking apparatus operates on another metal sheet.

In the illustrated embodiment, the centering and blanking of elements 2 has been described using the metal sheet 3 of the shape shown in FIG. 2. However, the centering and blanking of elements 2 may similarly be performed by the blanking apparatus 1, using a metal sheet 42 of the shape shown in FIG. 8. The metal sheet 42 shown in FIG. 8 has thin portions 43, 44 which are not tapered, but stepped from respective corners 45, 46. The metal sheet 42 can also be centered well because the corners 45, 46 abut against the respective slanted guide surfaces 34, 35 and slide toward the center when the metal sheet 42 is lowered while lying horizontally by the pad 26.

Although a certain preferred embodiment of the present invention has been shown and described in detail, it should be understood that various changes and modifications may be made therein without departing from the scope of the appended claims.

What is claimed is:

1. A method of blanking elements of a belt for use in a continuously variable transmission, each having a body having opposite side edges which jointly provide a V-shaped surface for contact with a pulley of the continuously variable transmission and a head joined to a first edge of said body, symmetrically out of a metal sheet having a pair of thin portions on respective marginal edges thereof which are joined to a remaining portion of the metal sheet via respective corners, said method comprising the steps of:
   aligning a center of said metal sheet with a predetermined center of a pair of counter punches;
   blanking the elements out of said metal sheet, said elements remaining joined to said metal sheet by respective connectors which are formed in the respective thin portions of the metal sheet, said bodies having respective second edges remote from said first edge and formed in the respective thin portions of the metal sheet; and
   separating said elements from said metal sheet by cutting off said connectors along said second edges of the bodies.

2. A method according to claim 1, wherein said step of blanking the elements comprises the step of:
   blanking the elements out of the metal sheet so as to be displaced in a blanking direction by a distance equal to at least the thickness of the metal sheet between said corners, said connectors being inclined and joined to the blanked elements which lie parallel to said metal sheet.

3. A method according to claim 1, wherein said step of blanking the elements comprises the step of:
   forming said connectors each having a width which is 1 to 3 times the thickness of the metal sheet between said corners.

4. A method according to claim 1, wherein said step of blanking the elements comprises the steps of:
   placing said metal sheet on a die; and
   moving a pair of blanking punches toward said die to blank the elements out of said metal sheet;
   wherein said step of aligning a center of said metal sheet comprises the steps of:
   pressing said metal sheet horizontally against a pair of counter punches mounted in said die for movement into and out of said die in alignment with said blanking punches, respectively, before said elements are blanked out of said metal sheet, said counter punches having respective slanted guide surfaces disposed so as to be aligned with the respective corners of said metal sheet and inclined downwardly toward the center of said metal sheet; and
   guiding the corners of said metal sheet along said slanted guide surfaces, respectively, to center said metal sheet.

5. An apparatus for blanking elements of a belt for use in a continuously variable transmission, each having a body having opposite side edges which jointly provide a V-shaped surface for contact with a pulley of the continuously variable transmission and a head joined to a first edge of said body, symmetrically out of a metal sheet having a pair of thin portions on respective marginal edges thereof which are joined to a remaining portion of the metal sheet via respective corners, said apparatus comprising:
   a die for placing said metal sheet thereon;
   a pad for pressing said metal sheet against said die;
   a pair of counter punches mounted in said die for movement into and out of said die for abutting against a lower surface of said metal sheet at respective blanking positions thereon which are laterally spaced from each other; and
   a pair of blanking punches for lowering said metal sheet at the respective blanking positions thereon against said counter punches to blank the elements out of said metal sheet;
   said blanking punches having respective connector forming punches for forming connectors in the respective thin portions of the metal sheet, said bodies having respective second edges remote from said first edge and formed in the respective thin portions of the metal sheet;
   said die having cavities defined therein at respective positions aligned with said connector forming punches, respectively, for accommodating the connectors respectively therein.

6. An apparatus according to claim 5, wherein said blanking punches are shaped to cooperate with said counter punches for blanking the elements out of the metal sheet substantially parallel thereto so as to be displaced in a blanking direction by a distance equal to at least the thickness of the metal sheet between said corners, said connector forming punches and said cavities being shaped to incline said connectors to the blanked elements and joined in opposite directions to said elements.

7. An apparatus according to claim 5, wherein said connector forming punches are shaped to form said connectors each having a width which is 1 to 3 times the thickness of the metal sheet between said corners.

8. An apparatus according to claim 5, wherein said counter punches have respective slanted guide surfaces disposed so as to be aligned with the respective corners of said metal sheet and inclined downwardly toward the center of said metal sheet, for guiding the corners of said metal sheet along the slanted guide surfaces, respectively, to center said metal sheet when said metal sheet is pressed horizontally against said die by said pad before said elements are blanked out of said metal sheet by said blanking punches.

9. A method according to claim 2, wherein said step of blanking the elements compromises the step of:

forming said connectors each having a width which is 1 to 3 times the thickness of the metal sheet between said corners.

10. An apparatus according to claim 6, wherein said connector forming punches are shaped to form said connectors each having a width which is 1 to 3 times the thickness of the metal sheet between said corners.

* * * * *